(12) United States Patent
Bennett

(10) Patent No.: US 12,330,773 B2
(45) Date of Patent: Jun. 17, 2025

(54) PINTLE PIN ASSEMBLY MECHANISM

(71) Applicant: SAFRAN LANDING SYSTEMS UK LTD., Gloucester (GB)

(72) Inventor: Ian Robert Bennett, Gloucester (GB)

(73) Assignee: SAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 18/291,184

(22) PCT Filed: Jul. 13, 2022

(86) PCT No.: PCT/EP2022/069680
§ 371 (c)(1),
(2) Date: Jan. 22, 2024

(87) PCT Pub. No.: WO2023/001676
PCT Pub. Date: Jan. 26, 2023

(65) Prior Publication Data
US 2025/0100677 A1    Mar. 27, 2025

(30) Foreign Application Priority Data
Jul. 23, 2021    (EP) ..................... 21187379

(51) Int. Cl.
*B64C 25/08*    (2006.01)
(52) U.S. Cl.
CPC .................... *B64C 25/08* (2013.01)
(58) Field of Classification Search
CPC ......... B64C 25/02; B64C 25/08; B64C 25/26; B64C 2025/008
See application file for complete search history.

(56) References Cited

U.S. PATENT DOCUMENTS

| 1,641,700 | A | 9/1927 | Sperry | |
|---|---|---|---|---|
| 2,877,969 | A | 3/1959 | Dowty | |
| 2011/0033261 | A1* | 2/2011 | Bridgewater | ........... F16B 39/36 411/237 |

FOREIGN PATENT DOCUMENTS

| CN | 108945399 A | 12/2018 |
|---|---|---|
| CN | 109795677 A | 5/2019 |

(Continued)

OTHER PUBLICATIONS

European Search Report and Search Opinion received for European Application No. 21187379.9, mailed on Jan. 24, 2022, 8 pages.

(Continued)

*Primary Examiner* — Joshua D Huson
*Assistant Examiner* — Shanna Danielle Glover
(74) *Attorney, Agent, or Firm* — WOMBLE BOND DICKINSON (US) LLP

(57) ABSTRACT

An attachment assembly for an aircraft strut mounting joint. The attachment assembly includes a tubular structure having a central axis and at least one open end. The attachment assembly further includes at least one mounting pin arranged at least partially within the at least one open end of the tubular structure and moveable along the central axis between a retracted position and an extended position. In the extended position, a portion of the at least one mounting pin protrudes for engagement with a lug and in the retracted position the at least one mounting pin is withdrawn for disengagement with the lug. The attachment assembly further includes a retraction mechanism arranged to convert a rotary input motion into linear motion of the at least one mounting pin along the central axis to drive the at least one mounting pin between the extended position and the retracted position.

14 Claims, 4 Drawing Sheets

(56) References Cited

FOREIGN PATENT DOCUMENTS

CN 113978705 A * 1/2022
KR 10-2012-0042247 A 5/2012

OTHER PUBLICATIONS

International Search Report and Written Opinion received for PCT Patent Application No. PCT/EP2022/069680, mailed on Oct. 21, 2022, 12 pages.

* cited by examiner

PINTLE PIN ASSEMBLY MECHANISM

BACKGROUND OF THE INVENTION

Aircraft include assemblies such as a nose landing gear, main landing gear and engines. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Various aircraft assemblies include a hinged or pivotal joint between a first component or structure of the aircraft and a second component or structure of the aircraft. An example of such a pivotal joint is the pintle, or strut mounting joint, that attaches the landing gear assembly to the aircraft structure so that the aircraft landing gear is movable between a deployed condition, for take-off and landing, and a stowed condition for flight.

FIG. 1 shows an example of an aircraft landing gear assembly 10, which illustrates the pintle joint. The landing gear assembly 10 includes a shock absorber 20, known as the main strut, comprising a main fitting 22 and a sliding tube 24. The sliding tube 24 may be coupled to a wheel and brake assembly 30. The aircraft landing gear assembly attaches to the underside of the aircraft via an attachment assembly 40 that forms a strut mounting joint with connection points c1a, c1b on the underside of the aircraft.

The top of the main fitting 22 defines a horizontal tubular structure 42 having openings 44a, 44b to pintle sockets at each end along a central axis, or pintle axis, PA. Each pintle socket carries a cantilevered pintle pin 46a, 46b, positioned such that a portion of the pintle pin (the portion visible in FIG. 2) protrudes from a respective opening 44a, 44b along the central axis PA. The protruding portions of the pintle pins 46a, 46b are arranged to engage with the connections points c1a, c1b, known as pintle lugs, on the underside of the aircraft. The central axis PA defines a pivot axis for the landing gear.

In this example, the strut mounting joint has two connection points c1a, c1b arranged to pivotally mount a pair of cantilevered pintle pins 46a, 46b at opposite ends of the tubular structure 42. However, other aircraft designs may have only a single connection point arranged to pivotally mount a single pintle pin arranged within a pintle socket at one end of the tubular structure 42. In this instance, the other end of the tubular structure may be blind.

It is desirable for the aircraft landing gear to be removable or detachable from the aircraft structure to permit, for instance, assembly and disassembly of the aircraft. In other words, the strut mounting joint should be capable of being assembled and disassembled. As will be appreciated, this cannot be achieved with the pintle pins 44a, 44b present in their mounting position. For example, the aircraft landing gear assembly 10 cannot be detached from the aircraft structure if the pintle pins are protruding from the pintle sockets and engaged with the pintle lugs.

In conventional attachment assemblies, the pintle pins 46a, 46b can be removed completely to permit assembly and disassembly of the strut mounting joint. For example, during assembly the pins can be fitted from the outside by lining up the pintle lug of the aircraft with the pintle socket of the landing gear and inserting the pintle pin into the socket from the outside ends of the pintle lugs. However, in some circumstances, and with some aircraft designs, there is insufficient access outside the ends of the aircraft pintle lugs.

Alternatively, the pins can be fitted from the inside of the tubular structure, via a cut away or slot, and pushed outwards into their respective mounting positions to engage with the pintle lugs. However, this can reduce the strength of the pintle socket area, or other part of the main fitting 22. Additionally, there may still be insufficient access.

Although these problems have been described in the context of the strut mounting joint illustrated in FIG. 1, it will be appreciated that these problems exist equally for any pintle-type joint in an aircraft with limited access.

SUMMARY OF THE INVENTION

The present invention aims to address at least the problems identified above.

(1) According to a first aspect, the invention provides an attachment assembly for an aircraft joint. The attachment assembly comprises a tubular structure having a central axis and at least one open end. The attachment assembly further comprises at least one mounting pin arranged at least partially within the at least one open end of the tubular structure and moveable along the central axis between a retracted position and an extended position. In the extended position, a portion of the at least one mounting pin protrudes from the at least one open end of the tubular structure for engagement with a lug and in the retracted position the at least one mounting pin is withdrawn into the tubular structure for disengagement with the lug. The attachment assembly further comprises a retraction mechanism disposed within the tubular structure and coupled to the at least one mounting pin, the retraction mechanism arranged to convert a rotary input motion into linear motion of the at least one mounting pin along the central axis to drive the at least one mounting pin between the extended position and the retracted position.

The at least one mounting pin can be roughly cylindrical, and arranged such that the central axis of the pin (the pin axis) aligns with the central axis of the tubular structure. The at least one pin can have an internal face (back side) and an external face (front side) disposed at opposite ends of the pin along the central axis. The internal face of the pin remains inside the tubular structure throughout the range of motion of the pin (i.e., in both the extended and retracted positions). The external face of the pin protrudes from the open end of the tubular structure in at least the extended position. In the retracted position, the external face of the pin may be inside the tubular structure, or may still protrude from the open end but to a lesser extent than in the extended position. The rotary input may be provided manually, such as by an aircraft engineer.

In a preferred embodiment, the tubular structure is open at both ends (i.e., opposite ends along the central axis) and the attachment assembly comprises a pair of mounting pins arranged with one pin at each end. The retraction mechanism may be arranged between the two mounting pins.

(2) Optionally, the retraction mechanism comprises a leadscrew mechanism. As will be appreciated, a leadscrew—also known as a power screw or translation screw—is a screw used as a linkage in a mechanism for translating turning (rotary) motion into linear motion. With this arrangement, the radial extent of the retraction mechanism (relative to the central axis) can be reduced, which enables the mechanism to be more compact.

(3) The leadscrew mechanism may comprise a threaded shaft arranged along the central axis and configured to engage a threaded bore in the at least one mounting pin. In other words, the threaded shaft provides the male member of the leadscrew and the mounting pin provides the female member of the leadscrew. Rotation of the male member relative to the female member causes linear motion of the male member relative to the female member, such that the pin moves relative to the threaded shaft along the central axis.

(4) Optionally, the leadscrew mechanism comprises a body fixed to the shaft and arranged to receive the rotary input motion. The body may be a nut, such as a hex nut, or other feature suitable for receiving rotary input via, for instance, a tool, such as a wrench (spanner). With this arrangement, the rotary input may be provided more effectively.

Alternatively, the threaded shaft may be fixed to the at least one mounting pin and the female member may be provided instead by a rotatable body having a threaded hole, or bore, configured to engage the threaded shaft. In this case, rotation of the body relative to the shaft (and the pin) causes linear motion of the shaft (and the pin) relative to the body along the central axis.

Advantageously, the at least one mounting pin rotationally fixed to the tubular structure, such as via a cross bolt or spline. With this arrangement, rotation of the pins can be prevented, which can improve the effectiveness of the retraction mechanism.

(5) Where the attachment assembly comprises a pair of (first and second) mounting pins, the threaded shaft advantageously comprises a first portion configured to engage a threaded bore in the first mounting pin, and a second portion configured to engage a threaded bore in the second mounting pin, wherein the first portion has a left-handed thread and the second portion has a right-handed thread. With this arrangement, rotation of the shaft causes linear motion of the first and second mounting pins in opposite directions along the central axis, so that the first and second pins can be extended and retracted together.

The first and second portions of the shaft may be connected together. The rotatable body may be fixed between the first and second portions.

(6) Optionally, the retraction mechanism comprises a lever mechanism including a lever coupled to the at least one mounting pin via at least one mechanical link. With this arrangement, the pins can be extended and retracted with lower input force.

(7) Where the attachment assembly comprises a pair of (first and second) mounting pins arranged at opposite ends of the tubular structure, the first and second mounting pins can be coupled to the lever via first and second mechanical links, respectively. The first and second mechanical links can be pivotally connected to the lever at different points along the lever's length.

(8) Optionally, the lever is connected to the tubular structure. The lever may be pivotally connected to the tubular structure at a point along the length of the lever, such as at the end of the lever. Alternatively, the lever may be coupled to the tubular structure via a further mechanical link. Alternatively, the lever may be floating in the sense that it is not fixed to the tubular structure.

(9) Optionally, the retraction mechanism is a slider crank mechanism comprising a rotatable shaft, wherein at least one end of the rotatable shaft is coupled to the at least one mounting pin via the at least one mechanical link.

(10) Optionally, the retraction mechanism is a cam and follower mechanism including a rotatable cam element coupled to the at least one mounting pin via at least one mechanical link. The rotatable cam element is a driver member arranged to impart oscillating or reciprocating linear motion to the at least one mechanical link by direct contact. The cam element can be a rotatable shape, such as a wheel or shaft.

(11) Optionally, the rotatable cam element is a spiral cam.

A spiral cam is part of cam and follower mechanism, where the at least one mechanical link acts as a follower. A spiral cam has a spiral-shaped groove, or slot, through which the follower is guided as the cam rotates. The radial distance of the groove from the axis of the cam at any one point defines the linear position of the follower, and thus the position of the at least one pin along the central axis.

The spiral cam can have at least one groove, or slot, extending less than 180 degree, more than 180 degree, or even more than 360 degrees. The spiral groove may have a circumferential portion, i.e., a portion where the radial distance of the groove from the axis of the cam remains constant, such that when the follower is contacting this portion rotation of the cam does not lead to movement of the at least one pin along the central axis. Such a portion may be arranged to prevent back-driving in the retracted position. Other means to stall and prevent back-driving of the mechanism will be known to the skilled person.

In a preferred embodiment, the tubular structure is open at both ends (i.e., opposite ends along the central axis) and the attachment assembly comprises a pair of mounting pins arranged with one pin at each end. The spiral cam is arranged between the two mounting pins and is coupled to each via first and second mechanical links, respectively. The spiral cam comprises two spiral-shaped grooves, or slots, arranged to guide the first and second mechanical links, which acts as followers.

(12) Optionally, the retraction mechanism comprises a drive element for receiving rotary input, such as a hex nut or the like.

(13) Optionally, the attachment mechanism comprises at least one outward stop arranged to limit the extension of the at least one mounting pin and at least one inward stop arranged to limit the retraction of the at least one mounting pin. The stop may be a mechanical stop formed between features of pins and internal features of the tubular structure. The at least one mounting pin may abut the outward stop in the extended position and the inward stop in the retracted position.

(14) The at least one mounting pin may be a pintle pin and the tubular structure may form part of a main strut of an aircraft landing gear assembly. In other words, the attachment assembly may form part of a strut mounting joint.

(15) According to a second aspect, the invention provides an aircraft landing gear assembly comprising the attachment assembly as described above. The invention may also provide an aircraft mounting joint comprising the attachment assembly as described above.

BRIEF DESCRIPTION OF THE DRAWINGS

Embodiments of the invention will now be described with reference to the accompanying drawings, in which.

DETAILED DESCRIPTION OF EMBODIMENTS

In general, the invention disclosed herein is applicable to any aircraft joint comprising a tubular structure with at least one mounting pin at one end. An example of such an aircraft joint is the pintle, or strut mounting joint, described above in relation to FIG. 1. However, this is not intended to limit the invention.

Figure 1:
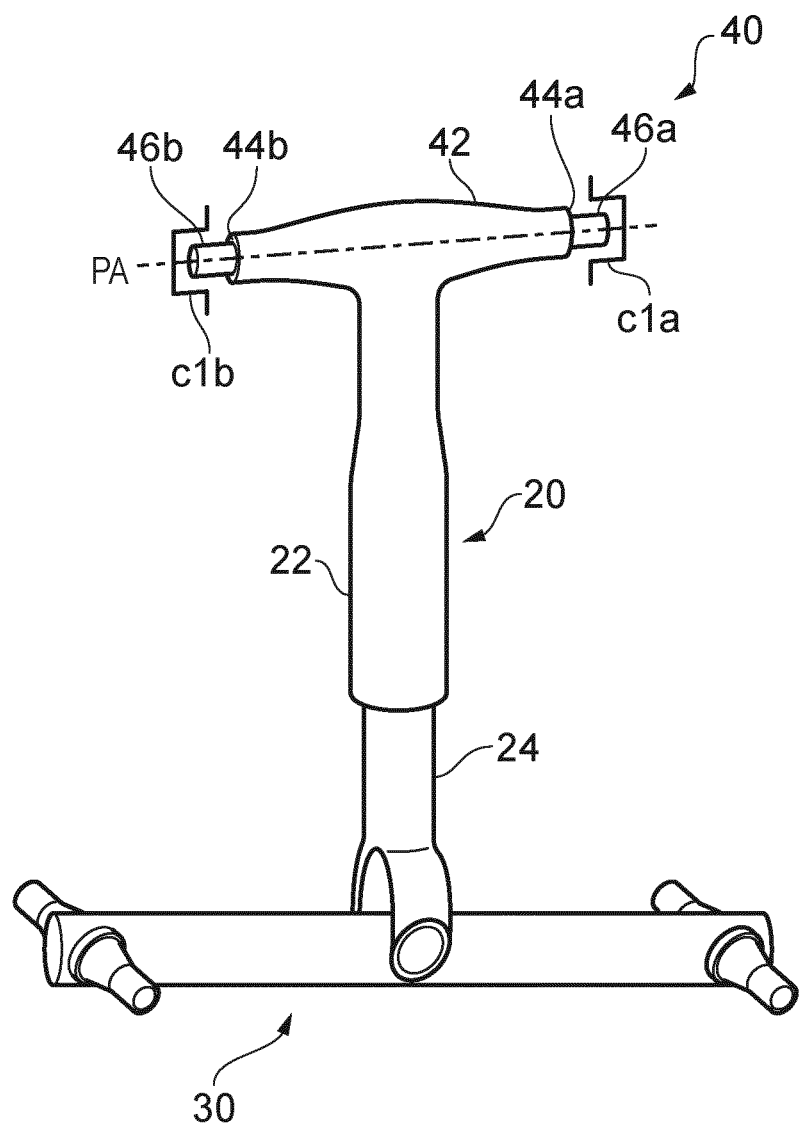
FIG. 1 is a diagram of an aircraft landing gear assembly, showing a strut mounting joint.

The term "pintle" has a specific meaning in the context of aircraft landing gear, describing the attachment point between the landing gear and the aircraft structure as shown in FIG. 1. However, the term also has a more general definition meaning any pivot or hinge joint between two components formed by the insertion of a pin of one component into a gudgeon of the other component. For disambiguation, the term "pintle" as used herein has its generic meaning, while the term "strut mounting joint" is used to specifically refer to the attachment between the landing gear and the aircraft structure.

For the sake of simplicity and clarity, the mounting joint may be described in the context of a strut mounting joint, such as that illustrated in FIG. 1. However, it will be appreciated that the discussion is equally applicable to any pintle-type joint.

Figure 2A:
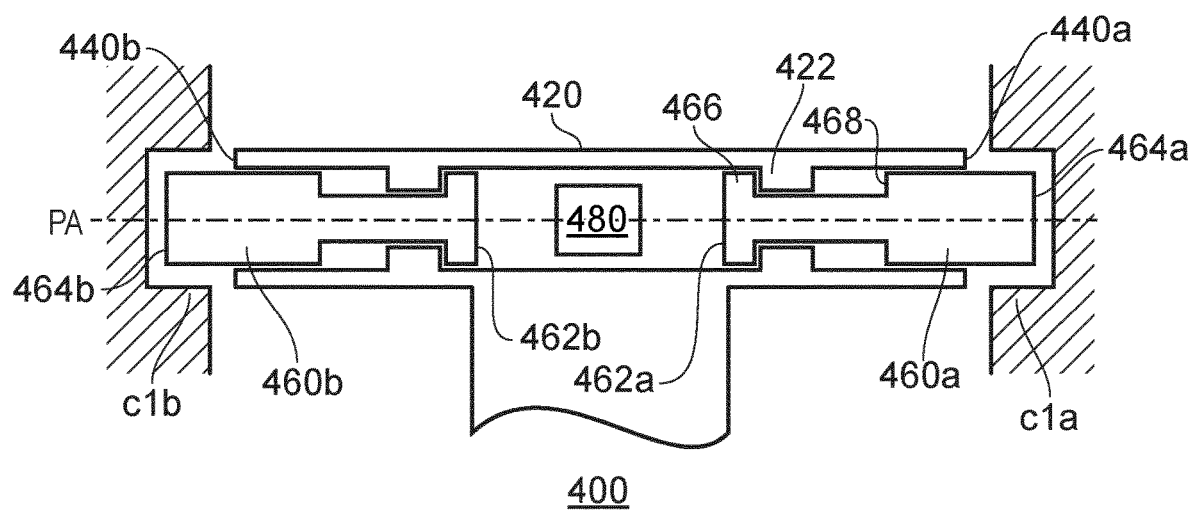
FIGS. 2a and 2b are diagrams of an attachment assembly in accordance with an example of the invention.
Figure 2B:
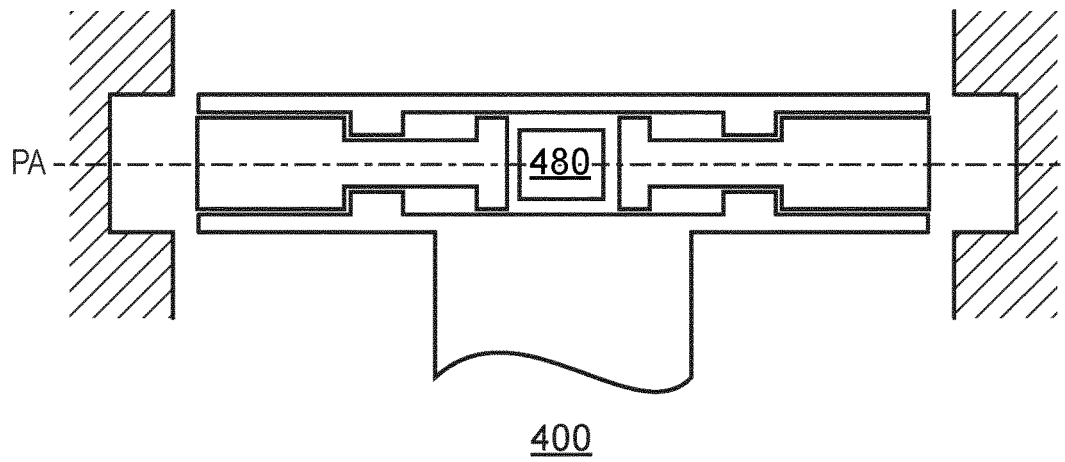

A cross-section of an aircraft joint is illustrated in FIGS. 2a and 2b. The joint is formed between an attachment assembly 400 of a first component and connection points c1a, c1b of a second component. The joint may be a strut mounting joint as discussed above in relation to FIG. 1, in which the first component is the main strut 22 of an aircraft landing gear assembly 10 and the second component is part of the aircraft structure.

The attachment assembly comprises a tubular structure 420 having a central axis PA. The tubular structure 420 has a first opening 440a to a socket at one end. The opposite end of the tubular structure 420 may have a second opening 440b, as shown in the figure, or may in other instances be blind. Each open end 440a, 440b of the tubular structure 420 carries a cantilevered pintle pin 460a, 460b positioned partially within the tubular structure, such that a portion of each pin 460a, 460b protrudes from its respective opening 440a, 440b along the central axis PA. The protruding portion of each pin 460a, 460b is arranged to engage with a respective connection point c1a, c1b. The connections points c1a, c1b may be lugs or gudgeons on the second aircraft element.

As already mentioned, the joint may be a strut mounting joint, as shown in FIG. 1. In this case, the tubular structure 420 may be the top portion of the main fitting 22, the mounting pins 460a, 460b are pintle pins cantilevered in pintle sockets, and the connection points are pintle lugs.

The present inventors have found advantages in being able to retract the pins for disengagement with the connections points to enable the joint to be assembled and disassembled. This avoids the problems associated with removing the pins, and/or inserting them from outside.

According to the invention, the pins 460a, 460b are moveable along the central axis PA between an extended position, shown in FIG. 2a, and a retracted position, shown in FIG. 2b. In the extended position, the pins 460a, 460b are arranged as discussed above for engagement with the connection points c1a, c1b. In the retracted position, the pins 460a, 460b are withdrawn along the central axis PA for disengagement with the connection points c1a, c1b. The pins 460a, 460b may be withdrawn completely inside the tubular structure 420, or alternatively a portion of the pins 460a, 460b may still protrude from the openings 440a, 440b, but to a lesser extent than in the extended position. In particular, the pins 460a, 460b should be withdrawn far enough to provide clearance between the pins 460a, 460b and the connection points c1a, c1b to enable disconnection of the joint.

Each mounting pin 460a, 460b can have an internal face (back side) 462a,b and an external face (front side) 464a,b disposed at opposite ends of each pin along the central axis PA. The internal face 462a,b of the pin remains inside the tubular structure 420 throughout the range of motion of the pin (i.e., in both the extended and retracted positions). The external face 464a, b of the pin protrudes from the open end of the tubular structure in at least the extended position. In the retracted position, the external face of the pin may be inside the tubular structure, or may still protrude from the open end but to a lesser extent than in the extended position.

In the example shown in FIGS. 2a and 2b, the range of motion of the pins 460a, 460b along the central axis PA is limited by outward and inward stops. The outward stop defines the extended position and an inward stop defines the retracted position. The attachment assembly may have an outward stop, and/or an inward stop, or may have neither. The stops in this example are mechanical stops formed between features of pins 460a, 460b and internal features 422 of the tubular structure 420. In the extended position, a first feature 466 of the pins 460a, b abuts one side of feature 422. In the retracted position, a second feature 468 of the pins 460a, b abuts another side of feature 422. However, the skilled person will readily appreciate other ways of structuring the pins and the inside of the tubular structure to achieve a mechanical stop. Additionally, other means of limiting the motion of the pins, or fixing the pins in place, will be readily apparent to the skilled person, such as a cross bolt extending through the pins 460a, 460b and the tubular structure 420.

Although the attachment assembly has been described in relation to a pair of mounting pins, it will be appreciated that the assembly could equally comprise a single mounting pin arranged within an opening at one end of the tubular structure.

There are various ways in which the pintle pins could be moved between the retracted position and the extended position. For example, it is possible to provide a slot along a portion of the length of the tubular structure in a direction parallel to the central axis, through which a crossbolt extending across the pin can be guided. However, the inventors have found that such arrangements can be undesirable, due to weakening of the pintle socket area.

The present invention overcomes these and other draw backs by providing an attachment assembly 400 with a retraction mechanism 480 for moving the pins between the extended position and the retracted position along the central axis PA. The mechanism 480 can be any mechanism arranged to convert a rotary input motion into linear motion of the first mounting pin along the central axis PA to drive a mounting pin between the extended position and the retracted position. Each of the embodiments discussed below provides an exemplary arrangement for implementing this general concept. However, the skilled person will appreciate other arrangements that use this concept. The retraction mechanism 480 is disposed within the tubular structure. In two-pin arrangements, such that those of the figures, the mechanism 480 may be position between the mounting pins 460a, b in a substantially central position.

One mechanism for converting rotary motion into linear motion is a leadscrew mechanism (also known as a translation screw or a power screw), such as a turnbuckle arrangement. The male member of the leadscrew mechanism comprises a threaded shaft, such as a bolt, that extends along the central axis PA inside the tubular structure. The female member of the leadscrew mechanism can be provided by a hole, such as a threaded bore, extending into the pin along the central axis PA from the internal face of the pin. As will be appreciated, the male and female members can engage such that rotation of the shaft relative to the pin causes linear movement of the shaft relative to the pin along the central axis.

Figure 3:
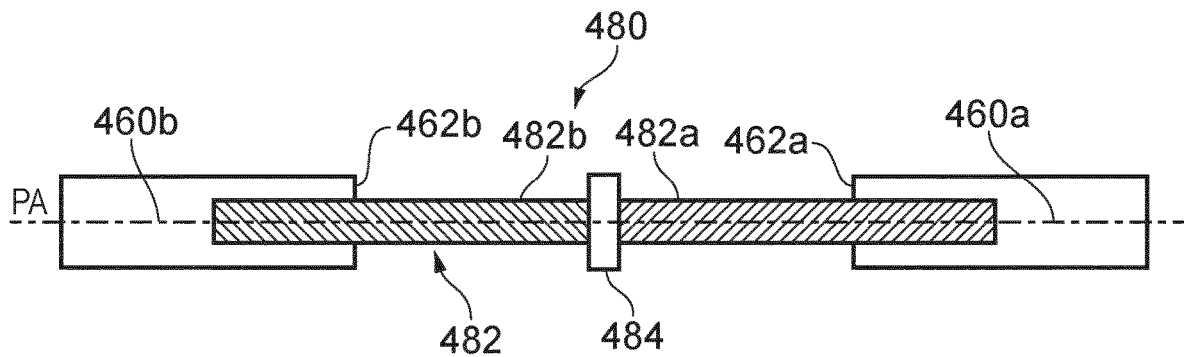
FIG. 3 is a diagram of part of an attachment assembly, including a retraction mechanism according to a first embodiment of the invention.

An example of a leadscrew mechanism in accordance with an embodiment of the invention is illustrated in FIG. 3. The leadscrew mechanism shown in FIG. 3 may be part of the attachment assembly shown in FIGS. 2a and 2b.

In this two-pin example, the threaded shaft 482 comprises a first portion 482a arranged to engage with a threaded hole in the internal face 462a of the first pin 460a, and a second portion 482b arranged to engage with a threaded hole in the internal face 462b of the second pin 460b. The first portion 482a and second portion 482b of the shaft 482 can be threaded in opposite directions as shown, so that rotation of the shaft 482 as a whole causes the pins 460a, b to move in opposite directions along the central axis PA. For instance, the first portion 482a of the shaft 482 can be left-handed and the second portion 482b of the shaft 482 can be right-handed.

The shaft 482 may receive rotational input via a body element 484, which may be a screw drive feature such as hex nut. In the example shown in FIG. 3, the body 484 is fixed to the shaft 482 between the first and second portions 482a, b so that rotation of the body 484 causes rotation of the shaft 482. Preferably, the body 484 is positioned centrally within the tubular structure 420, substantially equidistant from each pin 460a, b. An access point, such as a cutaway window in the tubular structure 420 may be provided to allow the body to be accessed and rotated.

It will be understood that when the body 484 is rotated in one direction, the pins 460a, b are drawn inwards towards the each other along the central axis PA, such that the pins 460a, b are driven towards their respective retracted positions. If the body 484 is rotated in the opposite direction, the pins 460a, b are pushed outwards away from each other along the central axis PA, such that the pins 460a, b are driven towards their respective extended positions.

Preferably, the range of motion of the pin is limited (using, for instance, the stop arrangement described above in relation to FIG. 2), so that the body can be 'floating', in the sense that it is not fixed to the tubular structure 420. With this arrangement, if one pin moves first then the other pin will be driven once the first pin reaches the end of its travel (e.g., abuts a stop).

Friction between the pins 460a, b and the inside of the tubular structure 420 (i.e., the socket) may be sufficient to prevent the pins 460a, b from rotating with the shaft 482. However, it is preferable that the pins 460a, b are rotationally locked, such as with a cross bolt or a key spline or the like.

As will be appreciated, the same concept could be implemented equally using the body 484 as the female member of the screw drive, while the pins 460a, b are fixed to the shaft 482. With this arrangement, rotation of the body 484 relative to the screw portions 482a, b causes linear movement of the shaft 482 (and in turn the pins 460a, b) relative to the body 484 along the central axis PA.

It will be apparent to the skilled person how the above discussion could be adapted for a single-pin arrangement. In this instance, the body could be rotatable but fixed in position along the central axis.

The above leadscrew example is a class of mechanism in which the resulting linear motion is parallel to the axis of rotation. In other words, in the context of the attachment assembly 400 the screw axis is parallel to the central axis PA. The following examples relate to a second class of mechanism in which the axis of rotation is perpendicular to the central axis PA.

A first example of this class of mechanism is a slider-crank mechanism. A slider-crank mechanism in accordance with embodiments of the invention is a mechanical linkage comprising a rotatable centre link, known as a crank, pivotally connected to at least one further mechanical link, known as a slider. The slider is pivotally connected to the crank at a radial distance from the rotation axis, such that rotation of the crank drives oscillatory or reciprocating linear motion of the slider in a direction perpendicular to the rotation axis.

Figure 4A:
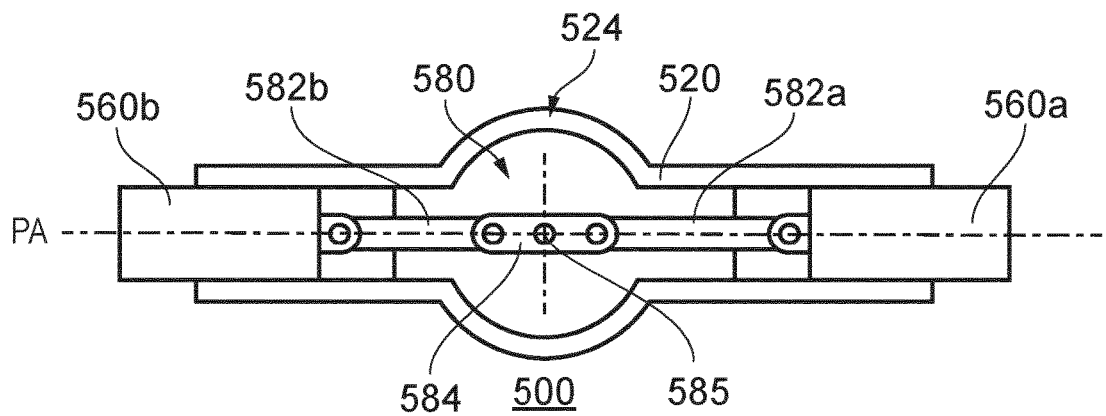
FIGS. 4a and 4b are diagrams of an attachment assembly, including a retraction mechanism according to a second embodiment of the invention.
Figure 4B:
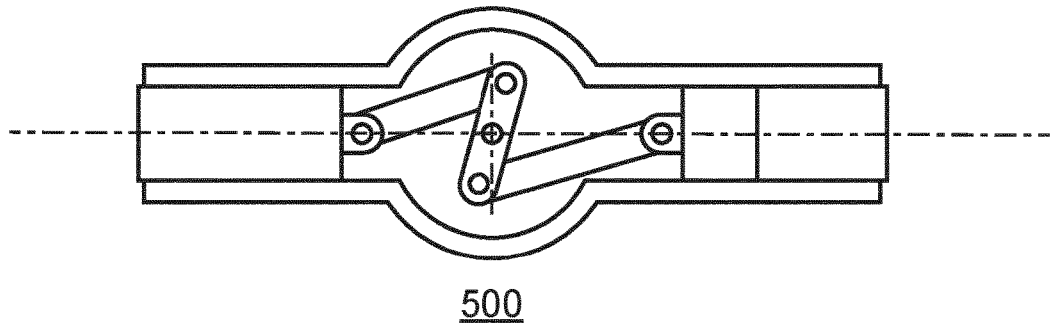

FIGS. 4a and 4b illustrate an example of an attachment assembly 500 including a slider-crank mechanism 580. The attachment assembly may be the attachment assembly 400 illustrated in FIG. 2. The mechanism 580 comprises a centre link 584 arranged to rotate about an axis 585 (coming out of the page) that is perpendicular to the central axis PA. For example, the centre link 584 may rotate about a bearing 585. One end of the rotatable centre link 584 is pivotally connected to a first mechanical link 582a, which may be rod or the like. The first mechanical link 582a is pivotally connected to the back of the first mounting pin 560a. In two-pin arrangements, the other end of the rotatable centre link can be connected in the same way to the second mounting pin 560b via a second mechanical link 582b, as shown.

The centre link 584 can be rotated to move the first and second pins 560a, b along the central axis PA between the extended and retracted positions, as shown in FIGS. 4a and 4b respectively. The extended position may be reached when the centre link is substantially aligned with the central axis PA, such that the linkage is at it longest. As the centre link 584 is rotated in either direction, the linkage shortens and the pins 560a, b are pulled together along the central axis towards their respective retracted positions. Thus, the range of motion of the pins 560a, b can in this case be defined by the mechanism without the need for stops or the like (though these can be implemented in addition).

The centre link can be locked (i.e., fixed) in a particular position, such as the extended and/or retracted position, by means of an off-centre bolt or wire-locking, for example.

The tubular structure 520 can be shaped to accommodate the rotation of the centre link 584. In particular, the tubular structure 520 can have an enlarged portion 524 as shown.

A second example of this class of mechanism is a cam and follower-type mechanism. A cam and follower mechanism in accordance with embodiments of the invention is a mechanical linkage including a rotatable cam element in contact with a follower element. The rotatable cam element is a driver member arranged to impart oscillating or reciprocating linear motion to the at least one mechanical link by direct contact.

Similarly to the slider-crank mechanism, rotary movement of the cam is converted into linear displacement of the follower because the effective length of the linkage between the rotational axis of the cam and the pin along the central axis changes as the cam link rotates. However, unlike the slider-crank mechanism described above, the follower of a cam mechanism may not be connected to any particular point on the cam element. Instead, the cam can rotate relative to the follower, so that the part of the follower in contact with the cam follows a path on or within the cam.

Figure 5:
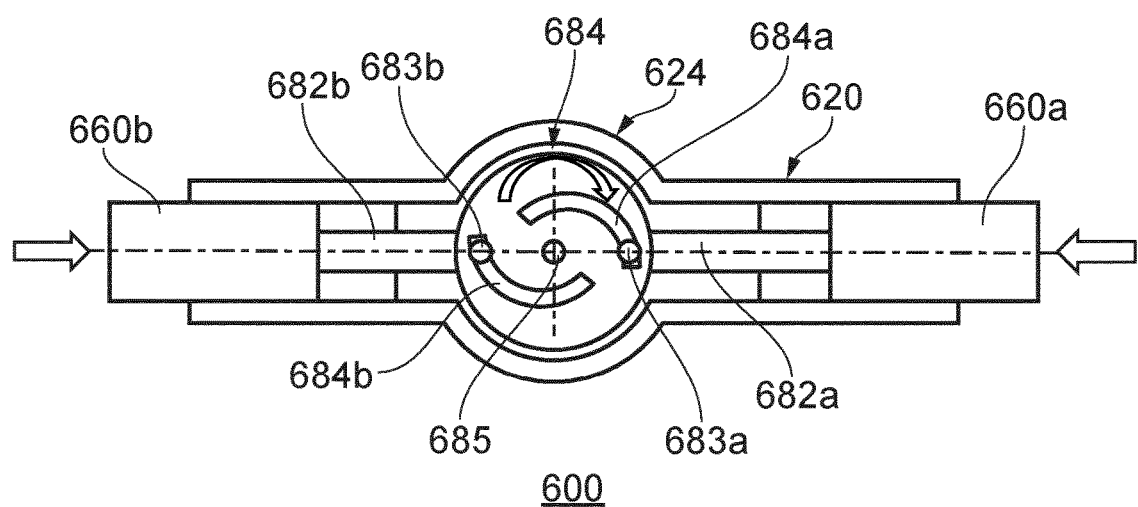
FIG. 5 is a diagram of an attachment assembly, including a retraction mechanism according to a third embodiment of the invention.

Various cams will be known to the skilled person, such as plate cams, face cams, cylindrical cams, snail cams and spiral cams. FIG. 5 illustrates an example of an attachment assembly 600 that uses a spiral cam 684. The spiral cam 685 comprises a pair of spiral slots or grooves 684a, b. A first mechanical link 682a, acting as a follower, connects the back side of the first pin 660a to the first slot 684a in the cam 684 and a second mechanical link 682b, also acting as a follower, connects the back side of the second pin 660b to the second slot 684b in the cam 684. As the cam 684 rotates around its rotation axis 685, the end 683a, b of each mechanical link 682a, b is guided along the slot to a position in the cam 684 that is radially closer or further away from the rotational axis 685 of the cam 684. As a result, the effective length of the linkage between the rotational axis of the cam and each pin is changed, causing the pins to move along the central axis PA of the tubular structure 620.

The ends of the slots can define the range of movement of the pins. FIG. 5, for example, shows the pins in their respective extended positions.

An advantage of this type of cam is that the pins can be moved in both directions by direct rotation of the cam, without the need for external biasing.

Similarly to FIG. 4 above, the tubular structure can be shaped to accommodate the size and shape of the cam, such as will the enlarged region 524 as shown.

The cam may be locked (i.e., fixed) in a particular position, such as the extended and/or retracted position analogously to FIG. 4.

A third example of a mechanism that may be considered part of the second class is a lever-type mechanism comprising a linkage extendable via a lever. The lever mechanism operates similarly to that of the slider-crank FIG. 4, except that in this case the centre link is, or is connected to and rotated via, a lever.

Figure 6:
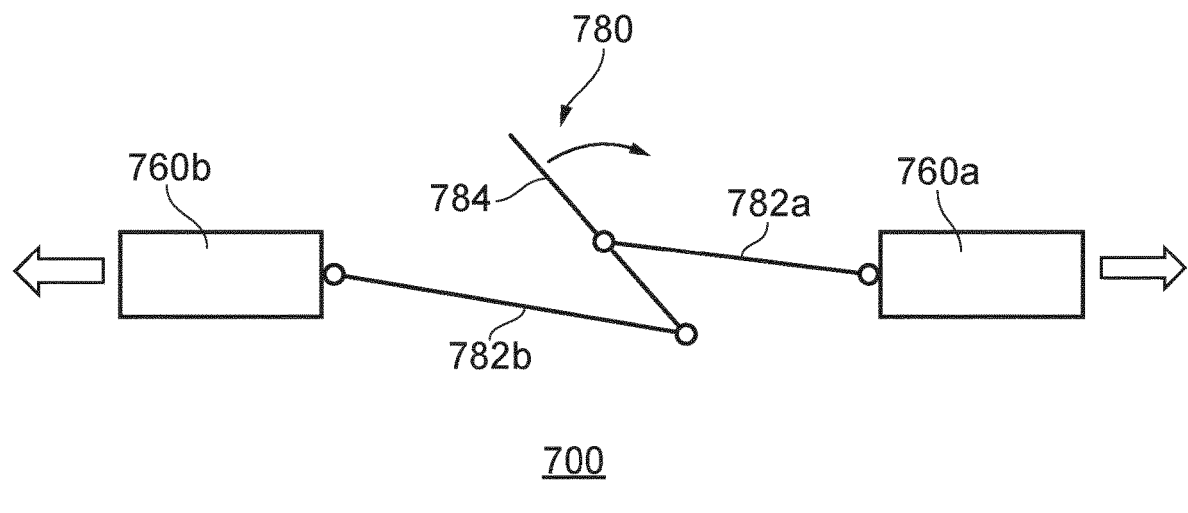
FIG. 6 is a diagram of part of an attachment assembly, including a retraction mechanism according to a fourth embodiment of the invention.

FIG. 6 shows an example of a lever mechanism 780. Lever mechanism 780 may be mechanism 480 in the attachment assembly 400. In the illustrated example, the attachment assembly comprises a pair of (first and second) mounting pins 760a, 760b arranged at opposite ends of the tubular structure (not shown), as per the previous figures. The first and second mounting pins 760a, b are coupled to the lever 784 via first and second mechanical links 782a, b, respectively. The first and second mechanical links 782a, b can be pivotally connected to the lever 784 at different points along the length of the lever 784. As such, the length of the linkage is changed as the lever 784 rotates.

With a two-pin arrangement as shown in FIG. 6, the lever 784 can be 'floating', provided that the range of motion of the pins is restricted (such as with the stops described in related to FIG. 2 above). Analogously to FIG. 3 above, if one pin moves first then the other pin will be driven when the first pin reaches the end of its travel (e.g., abuts the stop). Alternatively, the lever can be 'earthed' to the tubular structure (i.e., prevented from moving along the central axis relative to the tubular structure). For example, the lever can be pivotally connected to the tubular structure at a point along its length, such as at the end of the lever 784. Alternatively, the lever 784 may be coupled to the tubular structure via a further mechanical link. When the lever is earthed, the pins need not have anything restricting their range of motion (since the range of motion is limited by the linkage, which is fixed to the tubular structure). The earthed connection can define a rotational axis of the centre link.

The invention claimed is:

1. A main strut for an aircraft landing gear assembly, the main strut comprising:
   a tubular structure having a central axis and at least one open end;
   at least one pintle pin arranged at least partially within the at least one open end of the tubular structure and moveable along the central axis between a retracted position and an extended position, wherein in the extended position a portion of the at least one pintle pin protrudes from the at least one open end of the tubular structure for engagement with a pintle lug and in the retracted position the at least one pintle pin is withdrawn into the tubular structure for disengagement with the pintle lug;
   a retraction mechanism disposed within the tubular structure and coupled to the at least one pintle pin, the retraction mechanism arranged to convert a rotary input motion into linear motion of the at least one pintle pin along the central axis to drive the at least one pintle pin between the extended position and the retracted position.

2. The main strut of claim 1, wherein the retraction mechanism comprises a leadscrew mechanism.

3. The main strut of claim 2, wherein the leadscrew mechanism comprises a threaded shaft arranged along the central axis and configured to engage a threaded bore in the at least one pintle pin.

4. The main strut of claim 3, wherein the leadscrew mechanism comprises a body fixed to the threaded shaft and arranged to receive the rotary input motion.

5. The main strut of claim 3, comprising first and second pintle pins, wherein the threaded shaft comprises a first portion configured to engage a threaded bore in the first pintle pin, and a second portion configured to engage a threaded bore in the second pintle pin, and wherein the first portion has a left-handed thread and the second portion has a right-handed thread.

6. The main strut of claim 1, wherein the retraction mechanism comprises a lever mechanism, the lever mechanism including a lever coupled to the at least one pintle pin via at least one mechanical link.

7. The main strut of claim 6, comprising first and second pintle pins arranged at opposite ends of the tubular structure and coupled to the lever via first and second mechanical links, respectively, wherein the first and second mechanical links are pivotally connected to the lever at different points along the lever's length.

8. The main strut of claim 6, wherein the lever is connected to the tubular structure.

9. The main strut of claim 1, wherein the retraction mechanism is a slider crank mechanism comprising a rotatable shaft, wherein at least one end of the rotatable shaft is coupled to the at least one pintle pin via the at least one mechanical link.

10. The main strut of claim 1, wherein the retraction mechanism is a cam and follower mechanism, the cam and follower mechanism including a rotatable cam element coupled to the at least one pintle pin via at least one mechanical link.

11. The main strut of claim 10, wherein the rotatable cam element is a spiral cam.

12. The main strut of claim 9, wherein the retraction mechanism comprises a drive element for receiving rotary input.

13. The main strut of claim 1, further comprising at least one outward stop arranged to limit the extension of the at least one pintle pin and at least one inward stop arranged to limit the retraction of the at least one pintle pin.

14. An aircraft landing gear assembly comprising the main strut of claim 1.

* * * * *